United States Patent [19]

Kendall

[11] Patent Number: 5,230,720
[45] Date of Patent: Jul. 27, 1993

[54] AIR PURIFYING SIDE TABLE

[76] Inventor: Delbert B. Kendall, 1483 Eagle Dr., Robins Air Force Base, Ga. 31098

[21] Appl. No.: 823,389

[22] Filed: Jan. 21, 1992

[51] Int. Cl.$^5$ .............................................. B01D 19/00
[52] U.S. Cl. ........................................ 55/210; 55/279; 55/316; 55/467; 55/481
[58] Field of Search ................... 55/385.1, 467, 473, 55/385.8, 481, 478, 279, 316, 210

[56] References Cited

U.S. PATENT DOCUMENTS

| | | | |
|---|---|---|---|
| 2,061,535 | 11/1936 | Davies | 55/481 |
| 3,246,456 | 4/1966 | Sharp | 55/481 |
| 3,804,942 | 4/1974 | Kato et al. | 55/126 |
| 3,807,148 | 4/1974 | Fike et al. | 55/385 |
| 3,812,370 | 5/1974 | LaViolette | 55/279 |
| 3,890,126 | 6/1975 | Joseph | 55/385.1 |
| 4,092,136 | 5/1978 | Zimbardi | 55/212 |
| 4,119,419 | 10/1978 | Passaro et al. | 55/212 |
| 4,177,045 | 12/1979 | Orel | 55/385.6 |
| 4,623,367 | 11/1986 | Paulson | 55/385 |
| 4,732,591 | 3/1988 | Tujisawa et al. | 55/279 |
| 4,737,173 | 4/1988 | Kudirka et al. | 55/472 |
| 4,838,910 | 6/1989 | Stollenwerk et al. | 55/385.2 |
| 4,911,191 | 3/1990 | Bain | 134/200 |

FOREIGN PATENT DOCUMENTS 2362343 3/1967 France ............................ 55/467
190475 5/1989 Japan .

OTHER PUBLICATIONS

"Products for Practical Living," *Mechanix Illustrated*, Jan. 1984, p. 100.
"Air Filter Removes Odors as Well as Dust and Pollen," *Workbench*, Sep.-Oct., 1982, p. 76.
Freed, R. D., "A Machine to Clean the Air," *Mechanix Illustrated*, May 1979, p. 52 and 54.
Powell, E., "High-efficiency Filters," *Popular Science*, Oct. 1976, pp. 118-119 and 174.

*Primary Examiner*—Bernard Nozick
*Attorney, Agent, or Firm*—Carla J. Dolce

[57] ABSTRACT

An air purifying apparatus presenting the appearance of a side table is constructed from a side table housing having a hollow interior compartment, an inlet port and an exhaust port. A filtration means is positioned within the hollow interior compartment between the inlet port and the exhaust port so that air entering the inlet port must pass through the filtration means before exiting through the exhaust port. An air blower means is also positioned within the hollow interior compartment between the inlet port and the exhaust port so as to draw air into the inlet port and out through the exhaust port.

14 Claims, 2 Drawing Sheets

AIR PURIFYING SIDE TABLE

BACKGROUND OF THE INVENTION

1. Field of the Invention

The present invention relates to an air purifying apparatus having the appearance of a side table.

2. Description of Related Art

Many types of air purifying devices are known. Most commonly, air purifying devices are simple units containing a fan which forces air through a filter. Such units are cumbersome and have no other utilitarian or decorative function. Moreover, many such units are designed for specific commercial and industrial uses and are not suitable for home or office use such as the devices described in U.S. Pat. No. 4,911,191 to Bain, U.S. Pat. No. 4,838,910 to Stollenwerk et al., U.S. Pat. No. 4,623,367 to Paulson, and U.S. Pat. No. 4,092,136 to Zimbardi.

Some improvements have been made to air purifying units in an attempt to make them either ornamental or to give them a dual function. For example, U.S. Pat. No. 4,732,591 to Tujisawa, et al. describes an air cleaning apparatus presenting the appearance of a flower pot. The purpose of the device described in U.S. Pat. No. 4,732,591 is to provide an air cleaning device that is ornamental so that it may harmoniously blend with the decor of the room in which it is placed.

Other devices, such as those described in U.S. Pat. No. 4,119,419 to Passaro et al., U.S. Pat. No. 3,807,148 to Fike et al., and Japanese Pat. No. 89-190475/26 to Matsushita Electric Ind., provide the dual function of serving as an ashtray as well as an air cleaning device. Those devices are small in size and are limited to filtering the air in the space adjacent the ashtray portion of the devices. Thus, there is a need for an air filtering apparatus for use in the home or office capable of filtering larger quantities of air than ash tray type air cleaners and also capable of serving other functional and aesthetic uses.

SUMMARY OF THE INVENTION

The present invention comprises an air purifying apparatus having the appearance of a side table. More specifically, the disclosed apparatus is comprised of a side table housing having a hollow interior compartment, an inlet port and an exhaust port. A filtration means is positioned within the hollow interior compartment between the inlet port and the exhaust port so that air entering the inlet port must pass through the filtration means before exiting through the exhaust port. An air blower means is also positioned within the hollow interior compartment between the inlet port and the exhaust port so as to draw air into the inlet port, through the filtration means and out through the exhaust port.

The side table to which the apparatus of the present invention relates is the type that might typically be placed in a living room next to a reading chair or a couch. The apparatus is preferably constructed of the type of wood products typically used for the manufacture of household furniture. The apparatus of the invention may take any shape or size that is consistent with its dual use as a side table and an air purifying device.

In its simplest preferred embodiment, the apparatus of the present invention is comprised of a side table housing having an inlet port and an outlet port, a filtration means and an air blower means both positioned as described above within the side table housing. The inlet port is simply an opening, for example, in the top portion of the side table housing and the outlet port is simply an opening, for example, in the bottom portion of the side table housing. For improved aesthetic appearance, the inlet and outlet ports may be comprised of louvered openings.

In an especially preferred embodiment, the apparatus of the present invention is further comprised of a hollow conduit having an opening at its upper end and extending upwardly, in a generally vertical direction, from the inlet port. The opening at the upper end of the hollow conduit is preferably about three to five feet above the floor. Preferably, the hollow conduit is mated over said inlet port so that air drawn into the apparatus by the air blower means must pass through the hollow conduit before entering the inlet port.

Such an arrangement increases the height at which air is drawn into the apparatus and, thereby, increases the probability that smoke-laden air will be drawn into the apparatus and purified since such smoke-laden air tends to form a layer at a height of three to five feet above the floor in a typical household room having a ceiling height of about eight feet. Furthermore, because of the relatively large distance between the opening in the upper portion of the hollow conduit, which serves as the inlet for incoming air, and the exhaust port, an air circulation pattern is developed that covers a significantly larger room area than other previously known air purifying units.

In the especially preferred embodiment just described above, the apparatus of the present invention further comprises a lighting fixture attached to the hollow conduit. The heat from the lighting fixture tends to cause air to rise toward the opening at the upper portion of the hollow conduit. The effect of the heat on the air circulation pattern, however, is secondary to the effects of the air blower means and the distance between inlet port and exhaust port on the air circulation pattern. Nonetheless, for smoke generated near the lighting fixture, such as a lighted cigarette in an ashtray on the surface of the side table, the heat from the lighting fixture may have a significant effect on drawing such contaminated air toward and into the opening in the upper portion of the hollow conduit and through the air purifying apparatus.

Preferably, the hollow conduit presents the appearance of a lamp base. Thus, in the especially preferred embodiment just described, the apparatus of the present invention serves three utilitarian functions: (1) as an air purification unit, (2) as a side table, and (3) as a lamp fixture.

In yet another preferred embodiment, the air purifying apparatus of the present invention may include a plurality of hollow conduits extending upwardly from the inlet port. For aesthetic improvement, such plurality of hollow conduits may present the appearance of organ pipes.

Therefore, it is an object of the present invention to provide an air purifying apparatus presenting the appearance of a side table and serving the dual functions of a side table and an air purifier.

It is a further object of the present invention to provide an air purifying apparatus presenting the appearance of a side table and further comprising other aesthetic and/or functional components such as a lamp fixture or a plurality of hollow conduits having the appearance of organ pipes.

It is yet another object of the present invention to provide an air purifying apparatus capable of purifying larger quantities of air from larger room areas than previously known devices.

These and other objects of the present invention will become apparent to one skilled in the art from the detailed description that follows.

DESCRIPTION OF THE PREFERRED EMBODIMENTS

The preferred embodiments of the invention are described with reference to the FIGS. 1, 2, and 2A, wherein like numbers represent like parts.

Figure 1:
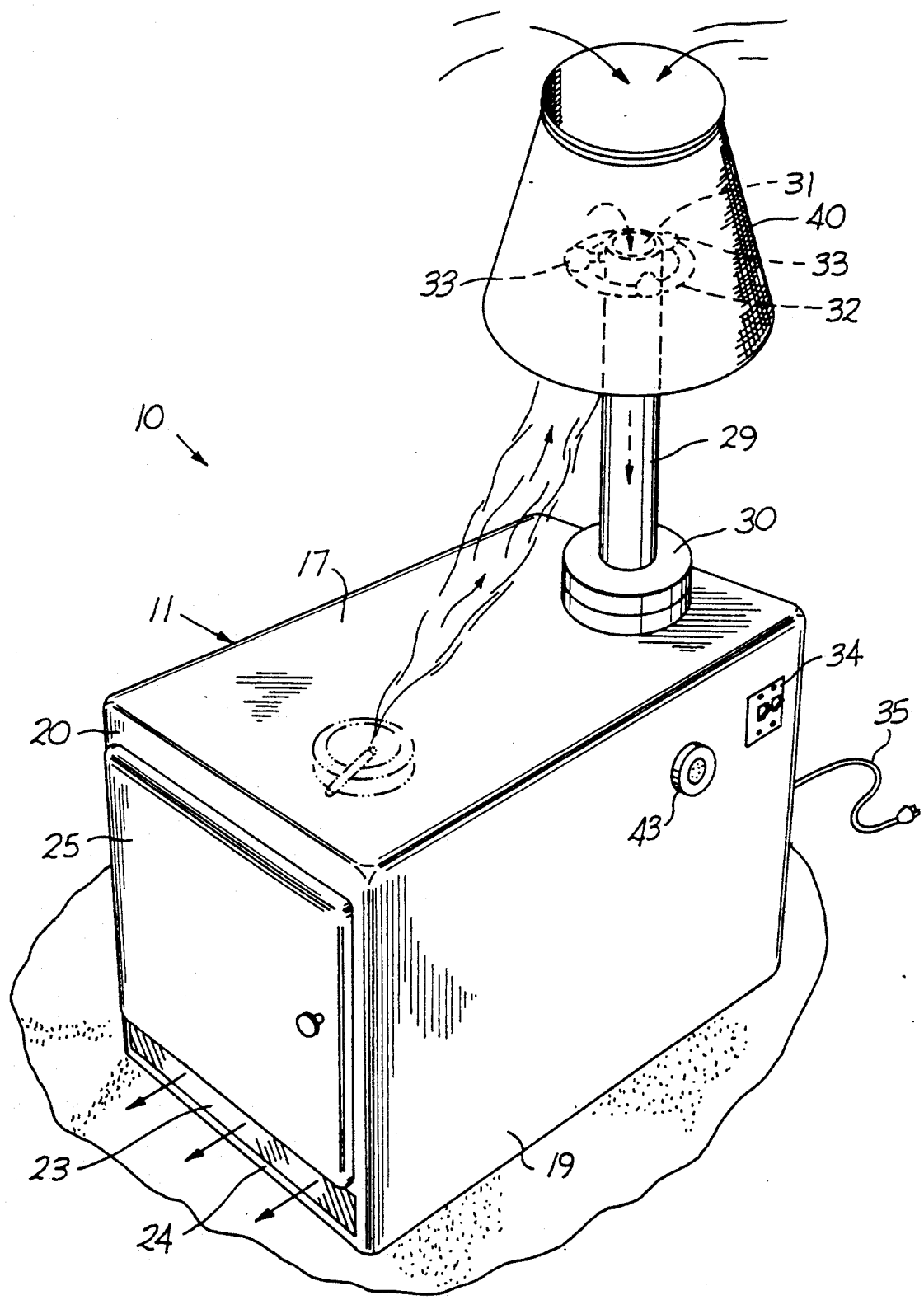
FIG. 1 is a perspective view of one embodiment of the apparatus of the present invention.
Figure 2:
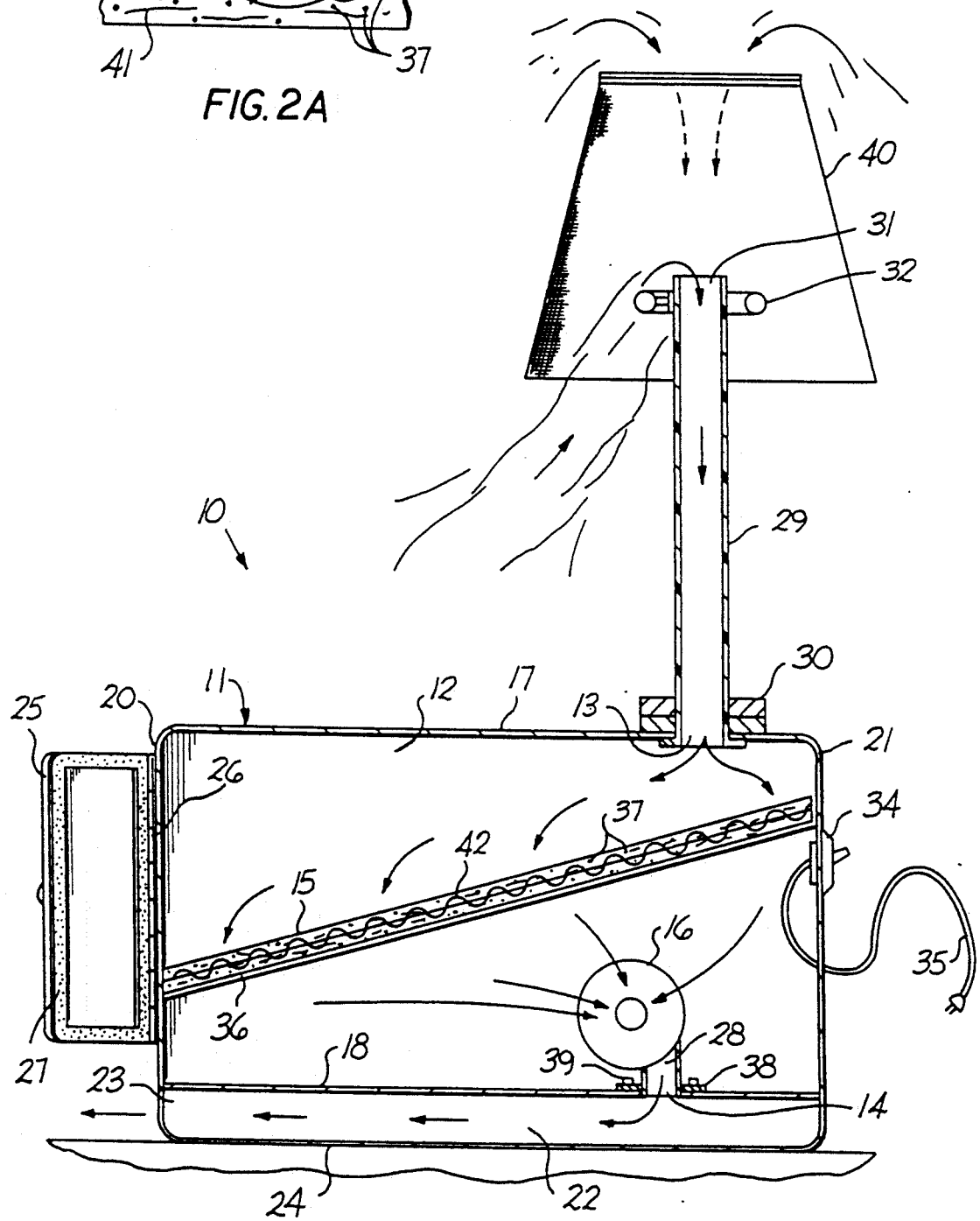
FIG. 2 is a cross-sectional side view of that embodiment of the apparatus shown in FIG. 1.
Figure 2A:
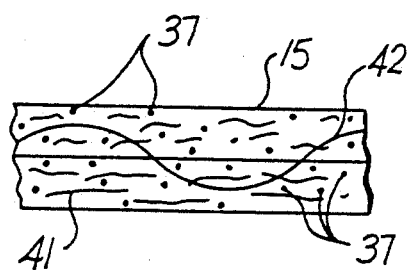
FIG. 2A is a fragmentary, cross-sectional view of a filter that may be used with the present invention.

As depicted in FIGS. 1 and 2, air purifying side table 10 comprises side table housing 11 having hollow interior compartment 12, inlet port 13, and exhaust port 14 (shown only in FIG. 2); filtration means 15; and air blower means 16. Side table purifier 10 is operated by electrically activating air blower means 16 which blows air out through exhaust port 14, thereby creating a relative vacuum within hollow interior compartment 12. This relative vacuum draws air from the room into inlet port 13. Filtration means 15 is positioned between blower means 16 and inlet port 13 so that air entering inlet port 13 must pass through filtration means 15 before being exhausted through exhaust port 14.

Side table housing 11 may take any shape or form which has an enclosed hollow compartment, such as enclosed hollow interior compartment 12, which is completely enclosed from its surroundings except for an inlet port such as inlet port 13 and an exhaust port such as exhaust port 14. Preferably, it is constructed of the types of wood products typically used for manufacturing household furniture. Such wood products help to absorb any vibrations and related noise from the operation of air blower means 16. To further reduce such noise, the interior walls of side table housing 11 may be insulated (not shown in the drawings) with any sound absorbing material.

Side table housing 11 may be constructed of three sides to form a triangular shape for use in the corner of a room. As shown in the drawings, side table housing 11 is constructed with four vertical sides to form a rectangular shape for general use such as next to a couch or chair.

In the preferred embodiments depicted in the drawings, side table housing 11 has table top 17, base 18, sides 19, front portion 20 and back portion 21. Base 18 is preferably between two and five inches above the bottom edges of sides 19 and back portion 21 so that base 18 is raised approximately two to five inches above the floor. Front portion 20 does not extend to the floor but extends only to base 18 while sides 19 and back portion 21 extend to the floor, thus, creating an air flow channel 22 between the floor and base 18 having exhaust opening 23 in front portion 20 of side table housing 11. Air blown through exhaust port 14 flows through air channel 22 and out through exhaust opening 23.

It is preferable that side table housing 11 also include floor cover 24 which is joined to the bottom edges of sides 19 and back portion 21. It was found during experimental operation that the apparatus constructed as depicted in FIGS. 1 and 2 but without floor cover 24 exposed the carpeted floor on which the apparatus was placed to the staining effects of residual contaminants not removed by filtration means 15. Floor cover 24 protects the floor from possible staining from such contaminates.

Preferably, side table housing 12 has a means, such as door 25, for accessing hollow interior compartment 12 and removing or replacing filtration means 15. Door 25 is hingedly connected to front portion 20 of side table housing 11, for example by door hinge 26 as shown in FIG. 2. Preferably, door 25, when in the closed position as shown in FIG. 1, is in sealing engagement with side table housing 11. This sealing engagement may be accomplished by continuous seal means 27 positioned interiorly adjacent the peripheral edge of door 25 as shown in FIG. 2. Continuous seal means 27 may be comprised of any commercially available weatherstripping material.

Preferably, exhaust port 14 is comprised of an opening in base 18, as depicted in FIG. 2, which opening is approximately the same size and shape as exhaust channel 28 of air blower means 16. Having exhaust port 14 and air blower means 16 located in base 18 helps to stabilize side table housing 11 particularly when its dimensions are relatively small, for example, when side table housing 11 covers only one square foot of floor space. Such a configuration also reduces noise from air blower means 16 since vibrations are directed toward the floor which may absorb such vibrations particularly when carpeted.

If a fan powered by an electric motor (not shown in the drawings) is used as the air blower means, then exhaust port 14 should have a diameter at least equal to the diameter of the circle formed by the rotation of the fan blades. Although not shown in the drawings, exhaust port 14 may be located on either of side walls 19 or on back portion 21 in which case, it is preferable for aesthetics that exhaust port 14 be comprised of a louvered opening.

In the especially preferred embodiment depicted in FIG. 2, inlet port 13 is a circular opening in table top 17. Hollow conduit 29 extends upwardly from inlet port 13 and has an interior diameter equal to the diameter of inlet port 13 and an exterior diameter greater than the diameter of inlet port 13. Hollow conduit 29 is placed over inlet port 13 so that it rests on table top 17 with the circumference of the inside surface of hollow conduit 29 mating with the circumference of inlet port 14. Hollow conduit 29 may be in sealing engagement over inlet port 13 by applying any commercially available form of flexible weatherstripping (not shown) between the bottom edge of hollow conduit 29 and table top 17. Hollow conduit 29 is supported in position over inlet port 13 by hollow conduit base 30, as depicted in FIGS. 1 and 2, which is attached to table top 17 by any conventional fastening means such as screws (not shown). Hollow conduit base 30 may take any shape or size that is capable of supporting hollow conduit 29.

Hollow conduit 29 has inlet opening 31, depicted in FIGS. 1 and 2, at its upper end to permit air to flow freely into hollow conduit 29 and into hollow interior compartment 12 through inlet port 13. Hollow conduit 29 may be of any size or shape, for example, it may be round, square, or other geometric shape. Hollow conduit 29 may be made of any available material, for example, plastic, metal, glass, porcelain, or clay. Preferably, hollow conduit 29 extends upwardly so that inlet opening 31 is at a height approximately between three and five feet above the floor. At this height, inlet opening 31 is at a level approximately equal to the level of the most contaminated air where cigarette smoke is the primary contaminate. Also, at this height, the distance between the air intake (inlet opening 31) and the exhaust (exhaust port 14 or exhaust opening 23) is great enough to create an air circulation pattern that encompasses an entire room of the size typically found in a residential home.

Hollow conduit 29 has lighting fixture 32 at its upper portion. As shown in FIG. 1, lighting fixture 32 is supported in place by supports 33 which are attached to hollow conduit 29 by rivets, screws or other conventional fastening means (not shown). Lighting fixture 32 is electrically connected to switch 34 which is mounted through back portion 21 or side 19 of side table housing 11. Switch 34 is electrically connected to normal household current through electric cord 35.

Lighting fixture 32 may be a fluorescent fixture as shown in FIGS. 1 and 2 or it may be an incandescent fixture. Lighting fixture 32 is preferably placed below inlet opening 31 so that it does not interfere with the air flow into hollow conduit 29. If lighting fixture 32 is fluorescent, it is preferably circular, as shown in FIGS. 1 and 2, so that it will provide light evenly around hollow conduit 29. Any ballast (not shown in the drawings) for the fluorescent fixture may be placed anywhere in hollow interior compartment 12 preferably where it is accessible for repairs or replacement and preferably on the exhaust side of filter means 15 so that it is exposed only to air that has passed through filtration means 15. If lighting fixture 32 is incandescent, it should preferably have a plurality of light bulbs evenly spaced around hollow conduit 29, below inlet opening 31, so that it will provide light evenly around the perimeter of hollow conduit 29. Lamp shade 40 is added to diffuse the light from lighting fixture 32. Lamp shade 40 may be any size, shape or color so long as it does not impede the flow of air into inlet opening 31 of hollow conduit 29.

Hollow conduit 29 may in fact be comprised of a plurality of hollow conduits presenting the appearance of organ pipes. Each such hollow conduit would have an opening at its upper portion at a height preferably from three to five feet above the floor. Such a plurality of hollow conduits would be positioned over iblet port 13 so that incoming air must first pass through one of the hollow conduits before passing through inlet port 13.

Filtration means 15 is positioned within hollow interior compartment 12 between inlet port 13 and exhaust port 14 so that air entering hollow interior compartment 12 through inlet port 13 must pass through filtration means 15 before exiting through exhaust port 14. Filtration means 15 may be comprised of any commercially available air purification filter such as the "PURITY" air filter manufactured by Purity Home Products Inc., of Millersport, Ohio. Filtration means 15 may include one or more of the following filtration agents 37: activated charcoal, deodorant agent, dust-attracting agent, antifungal agent, sterilizing agent, and/or electrostatic particulate agent. As shown in FIG. 2A, filtration agents 37 may be impregnated onto fiber media 41. Fiber media 41 may be held into a rigid shape by wire mesh 42 as shown in FIGS. 2 and 2A.

As shown in FIG. 2, filtration means 15 is preferably positioned within hollow interior compartment 12 horizontally at an angle sloping downwardly from back portion 21 of side table housing 11 toward front portion 20. Filtration means 15 is so positioned that it completely partitions hollow interior compartment 12 into two parts so that all air drawn into hollow interior compartment 12 through inlet port 13 must pass through filtration means 15 before it can exit through exhaust port 14.

Filtration means 15 is supported by support lip 36 that extends around the perimeter of sides 19 and back portion 21 at an angle with respect to the horizontal as discussed above. Filtration means 15 rests on support lip 36.

Air blower means 16 is positioned within hollow interior compartment 12 between inlet port 13 and exhaust port 14 so as to draw air into hollow interior compartment 12 through inlet port 13 and out through exhaust port 14. Preferably, air blower means 16 comprises a blower of the type commonly referred to as a squirrel cage blower. As shown in FIG. 2, blower means 16 has flange 38 for engaging exhaust channel 28 of the blower over exhaust port 14. The blower may be mated over exhaust port 14 by any fastening means such as screws 39 shown in FIG. 2. Air blower means 16 is electrically connected to and controlled by switch 34 which is electrically connected to normal household current through electric cord 35. Air blower means 16 may be electrically connected to smoke detector 43, shown on FIG. 1, so that detection of smoke activates the blower. Air blower means 16 may also be a fan, not shown, driven by means of an electric motor Many alternative embodiment are possible within the scope of the invention. For example, air filtration means 15 may be confined within a container having an inlet in direct fluid flow communication with inlet port 13 and an outlet in direct fluid flow communication with the air blower means 16 so that contaminated room air is drawn through the filtration means and out the exhaust port. Such a confinement of the filtration means would leave a portion of hollow interior compartment 12 available for conventional household storage. An additional door may be added to back portion 21 for access to the filtration means and the air blower means.

The above examples and the example that follows are not limiting. It will be understood that many variations and modifications can be effected within the spirit and scope of the invention as previously described and as defined by the claims.

EXAMPLE

Side table housing 11 was constructed of a fully enclosed, commercially available, rectangular side table being 13-inches wide, 19.5 inches deep and 21 inches high. Base 18 was 2 inches above the bottom edges of side 18 and back portion 21. Hollow conduit 29 was constructed of a piece of polyvinyl chloride (PVC) drain pipe having an inside diameter of about 4 inches and an outside diameter of about 4.5 inches and extending upwardly about 27.5 inches above table top 17. Hollow conduit 29 was completely open at its upper end and placed over inlet port 13 at its lower end so that all incoming air must pass through hollow conduit 13 before entering hollow interior compartment 12 through inlet port 13. Hollow conduit 29 was supported by hollow conduit base 30 as depicted in FIGS. 1 and 2. Hollow conduit base 30 was about 7.5 inches in diameter and about 1.5 inches high.

A 22 watt fluorescent lighting fixture was placed approximately 3.5 inches below inlet opening 31 and held in place by a plastic support screwed into hollow conduit 29. The ballast for the fluorescent lighting fixture was attached to base 18 inside of hollow interior compartment 12.

Filtration means 15 was comprised of a "PURITY" air filter manufactured by Purity Home Products, Inc., of Millersport, Ohio. The "PURITY" air filter was cut to fit into hollow interior compartment 12 as depicted in FIG. 2 with the back edge of the filter approximately 12 inches above base 18 and the front edge approximately 9 inches above the base 18.

Air blower means 16 was comprised of Dayton Shade-Pole Blower model number 2C647 manufactured by Dayton Electric Manufacturing Co. of Chicago, Ill. This blower is a 115 volt, 62 watt electric powered blower that operates at 1500 rpm. The blower was placed over exhaust port 14 and attached to base 18 as shown in FIG. 2.

The total energy requirements of air purification side table constructed with the fluorescent fixture and blower described above is 84 watts providing an energy efficient means for purifying the air in an average household room. During operation, the air purifying side table worked well to remove cigarette smoke quickly from an entire room.

What is claimed is:

1. An air purifying apparatus presenting the appearance of a side table, comprising
   a. a side table housing having a hollow interior compartment, an inlet port and an exhaust port;
   b. a filtration means positioned within said hollow interior compartment between said inlet port and said exhaust port so that air entering said inlet port must pass through said filtration means before exiting through said exhaust port;
   c. an air blower means positioned within said hollow interior compartment between said inlet port and said exhaust port so as to draw air into said inlet port and out through said exhaust port; and
   d. a hollow conduit extending upwardly from said inlet port and having at least one opening to permit air to flow through said hollow conduit and into said inlet port.

2. The air purifying apparatus as set forth in claim 1, wherein said side table housing is comprised of an enclosed, three-dimensional rectangle having two sides, a table top, a back portion, a front portion, and a base with said base joined to said two sides, to said back portion and to said front portion so as to create an air flow channel, having an exhaust opening, with said air flow channel being between said base and the surface on which said air purifying apparatus is placed, wherein said inlet port is an opening in said table top and said outlet port is an opening in said base so that air entering said inlet port must pass through said filter means before exiting through said exhaust port and through said air flow channel.

3. The air purifying apparatus as set forth in claim 1, wherein at least one of activated charcoal, deodorant agent, dust-attracting agent, antifungal agent, and sterilizing agent is contained in said filtration means.

4. The air purifying apparatus as set forth in claim 1, wherein said filtration means includes an electrostatic particulate removal agent.

5. The air purifying apparatus as set forth in claim 1, wherein said air blower means is an electric blower.

6. The air purifying apparatus as set forth in claim 1, further comprising a smoke detector means electrically connected to said air blower means so as to activate said air blower means when smoke is detected.

7. The air purifying apparatus as set forth in claim 1, wherein said hollow conduit is placed over said inlet port so that all air entering said inlet port must first pass through said hollow conduit.

8. The air purifying apparatus as set forth in claim 1, further comprising an air flow channel terminating in an exhaust opening wherein said air flow channel is in air flow communication with said outlet port so that air leaving said outlet port must pass through said air flow channel before being released into the room in which said air purifying apparatus is placed.

9. The air purifying apparatus as set forth in claim 1, further comprising a means for removing and replacing said filtration means.

10. The air purifying apparatus as set forth in claim 9, wherein said means for removing and replacing said filtration means is comprised of a door hingedly connected to said side table housing and permitting access to said hollow interior compartment.

11. The air purifying apparatus as set forth in claim 10, further comprising a continuous seal means positioned interiorly adjacent the peripheral edge of said door for sealing engagement with said side table housing upon closing said door.

12. The air purifying apparatus as set forth in claim 1, further comprising at least one lighting fixture connected to said hollow conduit.

13. The air purifying apparatus as set forth in claim 12, wherein the lighting fixture is a fluorescent light fixture.

14. The air purifying apparatus as set forth in claim 12, wherein the lighting fixture is an incandescent light fixture.

* * * * *